March 7, 1961 E. GEMMER 2,974,059
FLUIDIZED BED COATING PROCESS
Filed Dec. 20, 1957
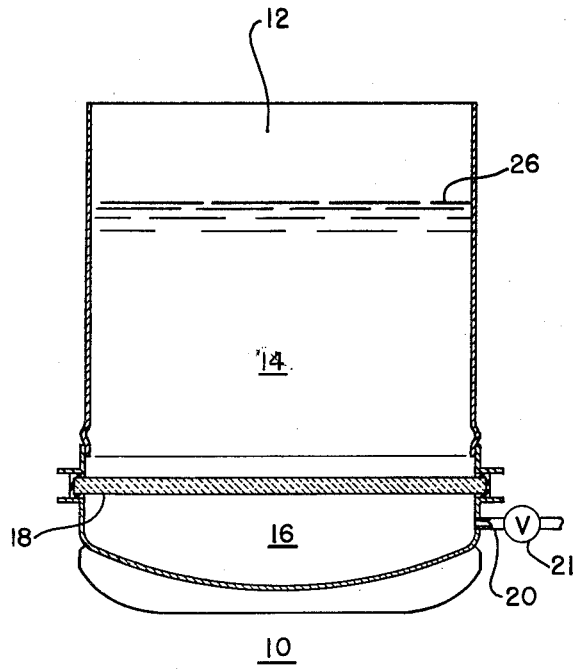
INVENTOR
*Erwin Gemmer*
BY
*Brumbaugh, Free, Graves & Donohue*
ATTORNEYS United States Patent Office 2,974,059
Patented Mar. 7, 1961

2,974,059

FLUIDIZED BED COATING PROCESS

Erwin Gemmer, Frankfurt am Main, Germany, assignor to Knapsack-Griesheim Aktiengesellschaft, Knapsack, near Koln, Germany, a German company Filed Dec. 20, 1957, Ser. No. 704,107

7 Claims. (Cl. 117—21)

This application is a continuation-in-part of my U.S. patent applications Serial No. 427,481, filed May 4, 1954, and Serial No. 551,943, filed December 8, 1955, now abandoned.

The present invention relates to protective coatings and to a method of producing such coatings on the surfaces of articles.

An important object of the present invention is the production of coatings which are particularly suitable for protecting the surfaces of articles which are exposed to normally destructive solvents, chemicals or corrosive agents, or which must be electrically insulated, or which must resist chemical abrasive or frictional wear. Some of the materials from which the articles to be coated may be made include the various metals such as steel, iron, aluminum, copper, zinc, as well as the alloys thereof.

Materials which possess superior resistance to chemicals and solvents or which are electrical insulators or which are resistant to mechanical abrasive or frictional wear often are quite expensive and do not possess sufficient mechanical strength and rigidity for use other than as coatings in mechanical structures. Also, the very resistance to solvents and other chemicals for which these materials may be valued make them difficult to use in the production of coatings by common presently known methods, such as by painting or spraying in a liquid solvent or liquid dispersion form.

Accordingly, it is another important object of the present invention to provide a new and improved process for the production of superior coatings without the necessity for the use of liquid solvents or dispersing agents for the coating materials.

Another object of the present invention is to provide an improved process which is particularly suited for coating articles of irregular and complex shapes. Such articles may include, for instance, wrenches, hammers, pliers, bolts, pins, tubular sleeves, hooks or clamps. They may also include plating racks, anode hangers, ventilators, gears, pump housings, sieves, screens, switches, electrical fittings, tanks and vessels, protective caps, bushings, bellows and innumerable other articles of greater or lesser complexity of shape.

Other objects and advantages of the invention will be apparent from the following specification.

In the process described in the copending applications referred to above the coating material, preferably in the form of pulverulent granules, is transformed into a fluidized bed, by introducing at least one current of gas under pressure therein; the bed being maintained in the fluidized state by controlling the flow of gas. The fluidized bed consists of a dense phase bounded by an upper free surface. Other characteristics of the fluidized bed are known and are referred to in the Serial No. 551,943. The article to be coated is heated and is at least partially immersed into the fluidized bed of the coating material. Individual particles of the coating material adhere and melt and fuse together with toher particles on the hot surface of the immersed portion of the article to form a continuous coating thereon.

In prior art coating techniques involving the application of heat, temperatures substantially above the degradation temperature of the coating material are generally avoided and temperatures above the transient degradation temperature, beyond which a certain amount of recognizable degradation occurs even during heating for a very brief period, are strictly avoided in order to prevent any loss in the desirable properties of the coating. According to the present invention, however, the immersed article is heated somewhat above the transient degradation point of the fluidized coating material. In this case at least a thin layer of at least partially degraded material will form on the immersed article, which usually has properties which are somewhat modified over the non-degraded material. It has been discovered that the modified properties are not seriously detrimental to the coating result, and in some instances the modified properties will be beneficial as in providing better adhesion. Above the degraded material a layer with normal properties will usually be formed. The layer of degraded material will usually be very thin because of the normally low heat conductivity of the coating material. By thus heating the immersed article above the transient degradation temperature of the coating material the improved results are especially notable if the immersed article has a relatively low wall thickness and/or a relatively small heat capacity, or if the fluidized material has only a small interval of temperature between the melting and degradation points.

The degree by which the degradation point can be exceeded depends on the thickness of the material to be coated, the powdered coating material used and on the thickness of the coating desired. Generally, the object is heated about 40° F. to about 90° F. above the transient degradation point. It is, however, also possible to exceed the transient degradation point by about 180° F. to about 270° F.

In the process of the present invention therefore, the temperature range in which the immersed article may be heated is determined by a minimum temperature at which the coating material sinters and some transient degradation occurs, and the maximum temperature at which the undesirably high degree of degradation of the coating material occurs or the article itself begins to deteriorate.

This invention is particularly valuable for, and applicable to, the production of coatings from high-melting high molecular weight organic polymeric permanently thermoplastic resins such as polyethylene and the linear polyamides generally referred to as nylons. Nylons which are particularly useful are polyhexamethylene adipamide, polyhexamethylene sebacamide, and the polycaprolactams such as the polymer of epsilon-caprolactam. However, the protective coatings of this invention may consist of any permanently thermoplastic resinous or resin-base material which has (1) a transient degradation point which is not far below, and preferably above its melting point, and (2) a sintering temperature lower than the deterioration temperature of the material from which the particular articles to be coated are made.

Another preferred characteristic of the coating materials is that they have a melting point not below 400° F., because only such materials have the required viscosity at the temperatures employed to produce a useful coating by spreading without having excessive run-off.

Among other coating materials which are suitable for the present purposes are most of the thermoplastic resins or those having a thermoplastic phase, and especially those which have a transient degradation temperature which is not far below and preferably above the sintering temperature thereof so that some melting or sintering may occur in the coating process. Specific examples of additional materials useful for this purpose are polystyrenes, acrylic resins, bitumen such as gilsonite or asphalt, shellac, and wax. Various compatible mixtures of two or more of the above materials may also be employed for the production of coatings in accordance with the present process. In cases where one of the materials in a coating mixture has a melting point which is substantially below the others, the low-melting material acts somewhat as a binder and the high-melting materials as fillers. Various other filler materials may also be added to any of the above coating materials for various purposes such as to impart desired properties or to reduce the cost of the coating materials. Examples of suitable filling materials, for instance, are powdered asbestos, slate, metal powders, heat stable powdered pigment materials, and polytetrafluoroethylene. Abrasive articles may be made by using abrasive fillers. Various other suitable coating materials and mixtures are given in the copending applications referred to above.

The coating material should preferably be pulverulent in order that it may be readily fluidized as explained below. In addition, it should be capable of being mixed together without appreciable packing or cohesion of the particles into larger aggregates. Any gas which is reasonably inert at the temperatures and with the materials employed may be used as the gaseous medium for fluidizing the coating material. Air is usually satisfactory and is preferred for reasons of economy; however, in order to avoid oxidation, it is sometimes preferable to use nitrogen or some other non-oxidizing gas. The pressure of the gas may vary greatly, depending on the particular shape and dimensions of the treating tank as well as on the particular type of coating material used, as more fully described in Serial No. 551,943.

The heating of the article should be to a temperature above the sintering or melting point as well as above the transient degradation temperature of the coating material. By "melting point" is here meant that stage wherein the coating material is sufficiently coalesced to provide a continuous coating of the article. By "sintering point" is here meant that stage wherein the coating material is sufficiently "tacky" or "sticky" to adhere to the surface of the article. By "transient degradation temperature" is meant the temperature at which an observable amount of degradation, i.e. observable altering of the mechanical and physical properties (usually at the innermost surface) occurs in a short time, i.e., the time of immersion.

Preferred apparatus for carrying out the process will be hereinafter more fully described in conjunction with detailed reference to the accompanying drawing which is an elevation view in section of a tank or container for holding a fluidized bed.

Various types of holding means for the article may be used. For instance, it is possible to merely use a pair of tongs with which the article is manually dipped into the fluidized bed, moved to and fro and is then withdrawn. It is also possible to use racks, conveyors, or other similar article-carrying means, as described in Serial No. 551,943.

In many instances it is preferable to mask the article holder or portions of the article being coated to prevent coating thereof. It has been found that a covering of various silicone resins which are of a grease-like consistency form particularly suitable masking materials.

The coating material, as has been stated above, is preferably used in pulverulent form and preferably has a granular size of between about 0.001 and about 0.024 inch. Best results have been obtained with a granular size of between 0.002 and about 0.012 inch. The period of immersion in the fluidized bed may vary within relatively wide limits depending upon the thickness of the coating desired. Depending upon the size and heat capacity of the article to be coated, the thickness of the coating desired, the powdered coating material used, and the temperature to which the article is preheated before coating, the best immersion time may vary from a fraction of a second up to several minutes. Generally, the time of immersion is kept below about 50 seconds, and preferably below about 30 seconds. When the article is removed from the fluidized bed, it initially appears covered with a powder. After a short interval of time, however, this powder melts, or coalesces into a continuous coating due to transfer of heat from the heated article. It will be understood that it is possible to permit the article to remain in the fluidized bed for an indefinite period during which the article may cool and the coating may solidify. If this is done, the coating will be relatively heavy and will possess a rough, powdery outer surface of powdered coating material which has not fully coalesced and is not entirely coherent to the remainder of the coating. It will be found, however, that the intermediate portions of the coating between the outermost surface and the innermost portions will possess progressively greater degrees of coalescence and that the innermost portions will be completely coalesced into a continuous covering for the article. Such a coating structure is desirable for some purposes.

If thin-walled articles are to be coated, the heat energy therein is sometimes not sufficient to cause the melting of the powder on the outside surface of the coating material; although the underlayer, or layer immediately adjacent to the article, has been melted. In such case, higher preheating temperatures can be used or the surface of the coating may be subsequently treated with a small gas torch flame or the article may be placed in an oven or heated by other means until the surface layer has been completely melted. This procedure may also be employed to completely melt the heavy coating produced when the article is permitted to cool in the fluidized bed as described at the end of the above paragraph, if desired. Only a few seconds are generally required to smooth off the surface with the flame; whereas heating time in the oven should be about 5 to 10 minutes; although this time will vary with the materials being used. With some materials, such as the polyamides, a relatively short post-heating period in a relatively hot oven is best, while with other materials, a longer treatment period in a cooler oven is best. With still other materials, it is inadvisable to heat the article at all after coating because such heating may injure the coating and provide unsatisfactory results. The coating is preferably allowed to cool slowly after which the coated articles are ready for use. It will be appreciated, however, that for some coating materials it may be preferable and more economical to rapidly cool the coatings such as by quenching in water. It may also be desirable, particularly where slow cooling is employed, to exclude oxygen during the cooling step in order to avoid excessive oxidation of the coating material. The resultant coating is smooth, coherent, has good adhesion, and is free from pores.

It is sometimes necessary, in order to obtain a good adhesion of the coating to the surface of the article, to clean and roughen the surfaces thereof as, for example, by means of sand or metal grit blasting or acid etching. This is particularly true of relatively large articles having relatively complex contours. For relatively small articles which do not have any concavities and larger articles having only convex surfaces to be coated, the sandblasting step may be omitted, since there is generally a certain amount of shrinkage of the coating onto the article so that a tight adhesion is automatically effected.

If the surfaces of the articles to be coated are likely to be greasy or oily, they should be degreased by a proper treatment with a suitable solvent such as carbon tetrachloride.

The apparatus 10 for carrying out the process of the present invention generally includes an open-topped container 12 of suitable cross-section, which is horizontally divided into an upper and lower chamber 14 and 16, respectively, by means of a porous partition 18. This partition, which should be pervious to the gas used but impervious to the particles of coating material, may preferably take the form of a porous ceramic plate, althuogh other similar structures may be advantageously used. The characteristics of the porous plate and the air flow through it are described in detail in Serial No. 551,943. It is advantageous to have a container 12 in which the walls incline outwardly toward the top, because the smaller particles ordinarily tend to ascend to greater heights in the fluidized bed and be lost by entrainment, and such a configuration retards the loss of the fine particles by entrainment and also tends to distribute the finer particles more uniformly throughout the bed and thereby produce a more uniform coating.

The pulverulent coating material is placed on the upper surface of the partition so that the articles to be coated can be, at least partially, immersed therein. Thereafter, a gas under pressure, as, for example, air or nitrogen, is blown into the lower chamber of the container through the pipe 20 and the valve 21 and penetrates through the porous partition into the powder, causing the powder to be converted into a continuously fluidized bed. A blower or fan may be built into the container 12 to supply the gas. This fluidized bed behaves substantially like a fluid so that it comes into contact with all the surfaces of the article. When fluidized, the individual particles become separated from one another and the bed of coating material appears to expand to occupy a greater volume and the upper surface of the mass of coating material 26 therefore rises to an equilibrium level within the container, as described in more detail in Serial No. 551,943. When the preheated article is immersed into the fluidized bed, the fluidized powder flows into all crevices, channels, holes, grooves and the like so that every part of the article comes into contact therewith. It will be understood, of course, that if the coating is only required on a portion of the article, only that portion need be immersed.

As mentioned above, the process and apparatus of this invention are adapted for use with articles composed of many different materials and for the application of coatings of many different materials. The following examples are therefore set forth merely for the purpose of illustrating how the process may be used for various materials, without necessarily limiting the scope of the invention thereto.

*Example 1*

A steel plate 0.30 inch thick is preheated to a temperature of about 660° F. and then immersed in a fluidized bed of high pressure polyethylene for about six seconds while maintaining the immersed article in to and fro movement. The fluidized bed consists of pure polyethylene having a particle size of between about 0.0078 inch and 0.0157 inch. The fluidizing gas used is nitrogen at a supply pressure of about 4 atmospheres and a temperature of about 68° F. After immersion the article is removed from the fluidized bed and permitted to cool. The layer is 0.20 inch in thickness. In spite of the low heat storage capacity of the article the process described gives rise to a sufficient thickness of the coating, the lowest layer of which is degraded and which therefore provides a good adherence of the coating to the article. Owing to the heat consumed by melting and to the relatively low heat transfer coefficient of the coating material itself, the material in the outermost portions in the coating layer is not superheated and therefore not degraded. The coating is absolutely free from pores and is smooth and glossy on the outside surface. A test with an electric spark device at 25,000 volts will indicate no breakdown of the coating.

*Example II*

Example 1 is repeated except that the steel plate is preheated to a temperature of about 720° F. before it is immersed in the fluidized bed of polyethylene powder. The time of immersion is 4 seconds and the thickness of the coating 0.018 inch. The lowest layer of the coating is degraded but the outer surface is not degraded but is smooth and free of pores.

The general procedure described in Examples I and II is repeated with different types of coating material and objects to be coated, in each case preheating the object above the degradation temperature of the coating material so that the lower layer of the coating is degraded but the outer surface is not degraded.

*Example III*

The object to be coated is a steel rod ½ inch in diameter by 2½ inches long preheated to 635° F. The coating material is nylon (polycaprolactam) having a particle size which passes through a 70 mesh sieve. The rod is immersed for 3 to 4 seconds in the fluidized bed to produce a coating of 0.010 to 0.012 inch.

*Example IV*

The object to be coated is a degreasing rack fabricated from 3/32 inch diameter steel wires and ¼ inch diameter steel wires preheated to 800° F. The coating material is the same as that used in Example III and the dipping time is 4 to 5 seconds. After removal from the fluidized bed the article is postheated in an oven to 600° F. for ½ to 1 minute. The coating thickness is 0.010 to 0.012 inch.

*Example V*

The object to be coated is a duplicate of that treated in Example III preheated to 600° F. The coating material is a mixture of nylons (polycaprolactam and polyhexamethylene adipamide) of particles which also pass through a 70 mesh sieve. Immersion time is 4 seconds and the coating thickness 0.012 inch.

*Example VI*

The object to be coated is substantially a duplicate of that treated in Example IV while the coating material is the same as that employed in Example V. The object is preheated to 850° F. and immersed for 3 to 4 seconds followed by postheating in an oven at 800° F. for 20 seconds. The coating thickness is 0.012 inch.

*Example VII*

The object to be coated is a steel rod 3/16 inch in diameter by 3 inches long preheated to 690° F. The coating material is a chlorinated polyether, i.e. poly-3,3-bis (chloromethyl)-1-oxabutene having a particle size which passes through a 70 mesh sieve. The rod is immersed for 4 to 5 seconds in a fluidized bed, withdrawn and postheated in an oven at 700° F. for 30 seconds. The coating thickness is 0.012 to 0.015 inch.

Although the articles to be coated may be easily manually dipped into the fluidized bed of coating material, it may be desired, particularly where many parts are to be coated, to employ a conveyor to carry the parts through the tank in a continuous or intermittent type of process as described in the application Serial No. 551,943. Pipes may be advantageously coated also by the particular procedures described in the latter application.

Obviously many modifications and variations of the present invention are possible in the light of the above teachings. It is, therefore, to be understood that within the scope of the appended claims the invention may be practiced otherwise than as specifically described.

I claim:

1. The process of forming a layer of material on a surface of an article which comprises forming a fluidized bed consisting of a dense phase bounded by an upper free surface by passing a distributed ascending current of gas through a mass of resinous solid pulverulent layer-forming material containing particles therein which sinter when heated, immersing the article surface in said dense phase while said article is heated to a temperature below the deterioration temperature of the article but at least as high as the sintering temperature of said particles and at least as high as the transient degradation temperature of said particles, and cooling the article.

2. The process of claim 1 wherein the article is preheated to said temperature before it is immersed in said dense phase.

3. The process of claim 1 wherein the article is heated to a temperature at least as high as the melting temperature of said particles.

4. The process of claim 1 wherein the article is removed from said dense phase and thereafter heated at a temperature high enough and for a time sufficient to improve the properties of the coating.

5. The process of claim 3 wherein said particles have a melting point not below 400° F.

6. The process described in claim 1 wherein the object is heated at least about 40° F. above the transient degradation temperature of the coating material.

7. The process described in claim 6 wherein the object is heated at least about 40° F. but not more than about 270° F. above the transient degradation temperature of the coating material.

References Cited in the file of this patent

UNITED STATES PATENTS

| | | |
|---|---|---|
| 2,663,652 | Railing | Dec. 22, 1953 |
| 2,668,125 | Baker et al. | Feb. 2, 1954 |
| 2,688,566 | Arnold et al. | Sept. 7, 1954 |
| 2,718,473 | Powers | Sept. 20, 1955 |
| 2,844,489 | Gemmer | July 22, 1958 |

OTHER REFERENCES

Gemmer: Industrie Anzeiger, 75th year, No. 12, Feb. 10, 1953, pages 141–143.